United States Patent [19]

Legrow et al.

[11] 4,239,867

[45] Dec. 16, 1980

[54] INHIBITED CURABLE SOLVENTLESS ORGANOPOLYSILOXANE COMPOSITIONS

[75] Inventors: Gary E. Legrow; Laura A. Gauthier, both of Midland, Mich.

[73] Assignee: Dow Corning Corporation, Midland, Mich.

[21] Appl. No.: 44,893

[22] Filed: Jun. 4, 1979

[51] Int. Cl.$^3$ .............................................. C08L 83/06
[52] U.S. Cl. ................................... 525/478; 525/479; 528/15; 528/21; 528/31; 528/32
[58] Field of Search .................... 525/475, 478, 479; 528/15, 21, 31

[56] References Cited

U.S. PATENT DOCUMENTS

| | | | |
|---|---|---|---|
| 2,894,930 | 7/1959 | Clark | 528/32 |
| 3,188,299 | 6/1965 | Chalk | 260/33.4 |
| 3,188,300 | 6/1965 | Chalk | 260/33.4 |
| 3,192,181 | 6/1965 | Moore | 528/15 |
| 3,383,356 | 5/1968 | Nielsen | 528/15 |
| 3,445,420 | 5/1969 | Kookootsedes et al. | 260/37 SB |
| 3,453,233 | 7/1969 | Flatt | 260/37 SB |
| 3,453,234 | 7/1969 | Kookootsedes | 528/15 |
| 3,532,649 | 10/1970 | Smith et al. | 260/37 SB |
| 3,697,473 | 10/1972 | Polmanteer et al. | 528/31 |
| 3,723,567 | 3/1973 | Mink et al. | 260/37 SB |
| 3,944,519 | 3/1976 | Mink et al. | 528/31 |
| 4,045,390 | 8/1977 | Itoh et al. | 528/21 |

*Primary Examiner*—Wilbert J. Briggs, Sr.
*Attorney, Agent, or Firm*—Robert L. McKellar

[57] ABSTRACT

What is disclosed is platinum catalyzed mixtures of silicon hydride and CH$_2$=CHSi—containing siloxanes which contain a platinum catalyst inhibitor and which may contain a reactive diluent to give prolonged resin working time and which do not give striations in the final cured resin product.

29 Claims, No Drawings

INHIBITED CURABLE SOLVENTLESS ORGANOPOLYSILOXANE COMPOSITIONS

BACKGROUND OF THE INVENTION

The present invention relates to inhibited curable organopolysiloxane resins.

Organopolysiloxane resins in which the substituent organic groups are methyl, phenyl, vinyl and/or similar organic groups are well-known. These materials cure through a variety of mechanisms, such as peroxide catalyzed vinyl groups on silicon or by the platinum catalyzed addition of silicon hydride to alkenyl groups on silicon. The properties of these organopolysiloxane resins such as toughness and retention of strength at high temperatures make them useful in casting resin applications. The resins that are useful for casting applications are those that have higher viscosities, on the order of 5.0 to 200 Pa.s or higher. These resins, even though they have the desired strengths, have one important disadvantage. Because of their high viscosities they are extremely difficult to handle in use. They do not pour rapidly and have slow flow when cast into place.

This disadvantage was recently overcome by the discovery that certain reactive diluents could be added to these resins to give the desired pourability and flow characteristics. This technology has been incorporated in a patent application and filed under U.S. Pat. Ser. No. 912,794, filed June 5, 1978 in the name of Gary E. LeGrow which subject matter is incorporated herein by reference.

Additional problems arise when these resins are used for encapsulating delicate electronic equipment. Part of the advantage in using these resins is the fact that they are highly transparent in the cured state which allows easy visual inspection of the encapsulated electronic part. If the resins do not remain transparent or if they contain striations then the visual inspection of such parts is made more strenuous. Secondly, these resins, when all the reactants are mixed together, begin to cure in a manner such that there is a limited working time for use of the resin for encapsulation and thus, it would be highly desirable to be able to prolong the working time of the resins so as to prevent waste, maintain adequate physical properties of the cured resin and get reproducibility in the cured product.

Several systems have been suggested and patented for causing inhibition in platinum catalyzed, silicon hydride addition to unsaturated organic group reactions. Such systems are shown in, for example, U.S. Pat. Nos. 3,188,299 (pyridines, picolines); 3,188,300 (organophosphorus); 3,192,181 (benzotriazoles); 3,344,111 (nitrile compounds); 3,383,356 (halocarbons); 3,445,420 (acetylenic compounds); 3,453,234 (sulfoxides); 3,532,649 (salts of tin, mercury, bismuth, copper) and 3,723,567 (aminoalkylalkoxysilanes).

Three of these patents show the use of amines to inhibit the platinum catalyzed silicon hydride addition reaction. U.S. Pat. No. 3,723,567 deals with primary and secondary amino compounds which it has been found do not work in the instant invention. U.S. Pat. Nos. 3,188,299 and 3,453,233 both deal with tertiary amino compounds but U.S. Pat. No. 3,188,299 deals with the inhibition of lower viscosity siloxanes and therefore, there is no striation problem to contend with as is the case when high viscosity resins are used. Furthermore, these materials are aromatic heterocyclic nitrogen compounds and bear no relationship to the inhibitors of the instant invention.

Finally U.S. Pat. No. 3,453,233 deals with the use of silazanes to inhibit the reaction of platinum catalyzed reactions. These silazanes, it is disclosed, also become part of the reaction and are incorporated into the final cured product. This differs from the instant invention which depends on the removal at elevated temperatures of the inhibitor compound.

THE INVENTION

This invention consists of an improved inhibited, curable composition comprising (a) an organopolysiloxane containing from 67 to 85 mol percent $C_6H_5SiO_{3/2}$ units and 33 to 15 mol percent of $CH_2=CH(CH_3)_2SiO_{\frac{1}{2}}$ units, said organopolysiloxane having an average of at least 8 silicon atoms per molecule; (b) a silicon hydride containing polysiloxane crosslinker for (a), said (b) being present in an amount sufficient to provide about 0.9 to 1.1 mol of silicon hydride per mol of $CH_2=CHSi\equiv$ present in (a) and (e); (c) a platinum catalyst of the formula $[(C_4H_9)_3PPtCl_2]_2$; (d) a catalyst inhibitor of the formula $R^1R^2R^3N$ wherein $R^1$, $R^2$ and $R^3$ are each monovalent alkyl radicals containing from 1 to 28 carbon atoms and there is a total of from 12 to 30 carbon atoms in the molecule; and (e) a reactive diluent of the formula $[CH_2=CH(CH_3)_2SiO]_2Si(C_6H_5)_2$.

In this invention, the organopolysiloxane resin (a) is the base resin. The resin (a) is essentially the same as that described in Mink et al., U.S. Pat. No. 3,944,519 and consists of monophenylsiloxy units in the range of 67 to 85 mol percent; dimethylvinylsiloxy units in the range of 33 to 15 mol percent. Preferred for resin (a) are 75 mol percent monophenylsiloxy units and 25 mol percent of the dimethylvinylsiloxy units.

This resin is easily prepared by conventional hydrolysis of the corresponding chloro or alkoxysilanes and condensation techniques. Although there does not appear to be any upper limit on the molecular weight of the resin (a), it should have a degree of polymerization of at least 8 silicon atoms per molecule. This is to ensure adequate physical strengths in the final product. The resin (a) can also be treated, for example, by alkaline condensation catalysts, to reduce the silanol content of the resin.

The silicon hydride containing siloxane (b) serves as a crosslinker and curing agent in the curable composition. This material can be any silicon hydride containing siloxane that is compatible and gives the cured composition the desired properties. This material can be, for example, the polymer found in the Mink et al. patent at column 2, lines 23-25 or $\{H(CH_3)_2SiO\}_2Si(C_6H_5)_2$ or $\{H(CH_3)_2SiO\}_3SiC_6H_5$. The crosslinker must have at least two (2) silicon hydrogens per molecule. There must be enough of (b) present to give from 0.9 to 1.1 mol of silicon hydride per mol of alkenyl groups in the curable composition. Preferred is a ratio of 1 mol of silicon hydride to 1 mol of alkenyl for the best results. The crosslinkers (b) can be prepared by conventional techniques known to those skilled in the art, for example, the cohydrolysis of the corresponding chlorosilanes.

The platinum catalyst (c) of this invention is

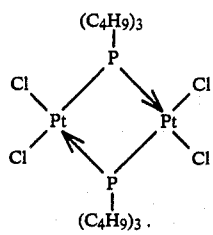

There should be at least 0.1 parts by weight of platinum per million parts by weight of the combined total of components (a), (b) and (e). It is preferred to employ 1-20 parts per million of platinum. This material is commercially available.

Component (d) of this invention, tertiary amine inhibitors, are commercially available products and their preparation will not be discussed further herein. The amines have the general formula $R^1R^2R^3N$ wherein $R^1$, $R^2$ and $R^3$ are each monovalent alkyl radicals having from 1 to 28 carbon atoms in each radical.

An additional requirement is that the amine inhibitor have a total of from 12-30 carbon atoms in the molecule. The usefulness of the amine inhibitor is primarily dependent on the volatility of the inhibitor and its compatibility in the siloxane resin system. Preferred inhibitors are those having at least one alkyl radical of 12 carbon atoms or more. Most preferred is an amine in which $R^1$, $R^2$ and $R^3$ are respectively octadecyl, methyl and methyl. It is contemplated within the scope of the present invention that materials having two or three larger alkyl groups i.e. 6 or more carbon atoms are useful. An example of each such material would be $(C_{10}H_{21})_2NCH_3$ and $(C_6H_{13})_3N$. The amine inhibitor is used in such an amount that there is present a ratio of 1-20 nitrogen atoms per each platinum atom present in the composition. Generally, the preferred amount of amine inhibitor useful in this invention is such that there is present 1 nitrogen atom for each platinum atom in the total composition. There must be at least 1 nitrogen atom per platinum atom. By using this type of inhibitor, the advantages of compatibility and inhibition are achieved. Other amine inhibitors tend to give striations in the cured product and also give inconsistency in the final physical properties of the cured product.

Component (e), the reactive siloxane diluent has the formula $[CH_2=CH(CH_3)_2SiO]_2Si(C_6H_5)_2$. This diluent is used in the composition of this invention in a ratio of 0-5 parts of (e) to 110 parts of (a), (b), (e). The preferred ratio when (e) is used is 2.5 parts of (e) to 110 parts of (a), (b) and (e). This diluent is prepared by conventional techniques of hydrolyzing chlorosilanes and distilling the hydrolysis product.

Generally for this system, the component (e), if used, is mixed with a small portion of the base resin (a) and the catalyst required for cure, into one package. The remainder of the base resin (a) and the crosslinker (b) are mixed together and form a second package. This first package normally contains the amine inhibitor. The means and manner for mixing these individual materials is not critical as long as the materials are homogeneous. The two packages can then be mixed together at the appropriate time for their use and cast into place. Upon heating, the composition cures. If other materials are to be mixed with the composition, they should be incorporated in the individual packages during their preparation rather than adding those materials at the final mixing of the whole composition. Other materials that can be incorporated in the resin composition of this invention are the conventional fillers such as glass fibers, finely divided silica, crushed quartz, powdered glass, asbestos, talc, carbon black, iron oxide, titanium oxide, magnesium oxide or mixtures thereof. Also included are pigments, dyes, oxidation inhibitors and release agents.

The curable composition can be employed in any conventional manner for casting or impregnating.

The components (a), (b), (c), (d), and (e) if used, are mixed together with any of the above desired additives and mixed to make homogeneous. The mixture is then fabricated into the desired form and cured, usually at elevated temperatures, for example 100°-150° C. It may be desirable in some cases to post cure the cured material at elevated temperatures, for example, up to 200° C.

These resins are especially useful for encapsulating electronic equipment such as backpack transistors, transformers and gas sensors for electronic auto emission testing.

The following examples are by way of comparison with the systems currently in the prior art. The examples are not intended as limiting the invention delineated in the claims.

EXAMPLE 1

This example illustrates the improved working time achieved by use of the instant invention.

$[(C_4H_9)_3PPtCl_2]_2$ (1.0 gms), 0.25 gms of $C_{18}H_{37}N(CH_3)_2$ and 93.25 gms of toluene were mixed together and labeled "C". A second material which is a base resin was prepared and had 75 mole percent phenyl$SiO_{3/2}$ units and 25 mole percent $CH_2=CH(CH_3)_2SiO_{\frac{1}{2}}$ units. A third component was prepared to give a silicon hydride containing crosslinker which contained 37.4 mole percent (phenyl)$_2$SiO units; 3.9 mole percent $(CH_3)_3SiO_{\frac{1}{2}}$ units and 58.7 mole percent of $(CH_3)HSiO$ units. A fourth component was the reactive diluent $[(CH_2=CH(CH_3)_2SiO]_2Si(C_6H_5)_2$. The base resin was mixed with the crosslinker in a weight ratio of 66.5:33.5 and this material was labeled "A". The reactive diluent was mixed with some more base resin in the weight ratio of 2.5:7.5 to form material "B".

Material "C", the catalyst with inhibitor (1.36 gms), was added to 27.27 gms of part "B" and the solvent was removed by vacuum. The resultant mixture was then added to 272.73 gms of part "A" and this mixture gave a working time of 3015 minutes at room temperature whereas a similar mixture without the inhibitor gave a working time of less than 240 minutes at room temperature. When the above formulation was cured at 125° C. for two hours, no striations were present in the hard, clear casting.

EXAMPLE 2

In this example, 1.5 gms of the catalyst plus inhibitor mixture of Example 1 was added to 300 gms of part "A" from Example 1 and the solvent was removed. The working time for this material was 3045 minutes at room temperature. When this material was cured in a 125° C. oven for 2 hours, there resulted a clear, hard casting with no striations.

EXAMPLE 3

When the base resin and crosslinker system of Example 2 was cured by $[(C_4H_9)_3PPtCl_2]_2$ catalyst using

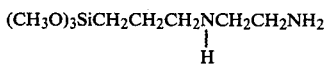

as the inhibitor, working time at room temperature was prolonged but there were severe striations in the cured casting.

That which is claimed is:

1. An improved curable composition comprising
   (a) an organopolysiloxane containing from 67 to 85 mol percent $C_6H_5SiO_{3/2}$ units and 33 to 15 mol percent of $CH_2\!=\!CH(CH_3)_2SiO_{\frac{1}{2}}$ units, said organopolysiloxane having an average of at least 8 silicon atoms per molecule;
   (b) a silicon hydride containing polysiloxane crosslinker for (a), said (b) being present in an amount sufficient to provide about 0.9 to 1.1 mol of silicon hydride per mol of $CH_2\!=\!CHSi\!\equiv$ present in (a) and (e);
   (c) a platinum catalyst of the formula $[(C_4H_9)_3PPtCl_2]_2$;
   (d) a catalyst inhibitor of the general formula $R^1R^2R^3N$ wherein $R^1$, $R^2$ and $R^3$ are each monovalent alkyl radicals containing from 1 to 28 carbon atoms, there is a total of from 12 to 30 carbon atoms in the molecule; and
   (e) a reactive diluent of the formula

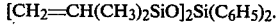

2. A composition as claimed in claim 1 wherein $R^1$ has 18 carbon atoms.

3. A composition as claimed in claim 2 wherein $R^1$ has 18 carbon atoms, $R^2$ is methyl and $R^3$ is methyl.

4. A composition of matter as claimed in claim 1 wherein there is present 80–90 parts of (a); 20–25 parts of (b); 5–15 ppm of Pt from (c); 1–4 parts of (e) and (d) is present in an amount sufficient to inhibit the catalytic effect of (c).

5. A composition of matter as claimed in claim 4 wherein there is present 86 parts of (a); 21.5 parts of (b); 10 ppm of Pt from (c); 2.5 parts of (e) and (d) is present in an amount sufficient to inhibit the catalytic effect of (c).

6. A composition as claimed in claim 5 wherein (d) is present in an amount such that there is 1–20 nitrogen atoms present for each Pt atom present.

7. A composition as claimed in claim 6 wherein (d) is present in an amount such that there is 1 nitrogen atom present for each Pt atom present.

8. A composition of matter as claimed in claim 1 when cured.

9. An article comprising an electronic component encapsulated with the composition of claim 1 and cured.

10. An article in accordance with claim 9 which is a backpack transistor.

11. An article in accordance with claim 9 which is a transformer.

12. An article in accordance with claim 9 which is a gas sensor for electronic auto emission testing.

13. A composition of matter which is a mixture of $[(C_4H_9)_3PPtCl_2]_2$ and an amine inhibitor of the formula $R^1R^2R^3N$ wherein $R^1$, $R^2$ and $R^3$ are each monovalent alkyl radicals containing from 1 to 28 carbon atoms, there is a total of from 12 to 30 carbon atoms in the molecule.

14. A composition as claimed in claim 13 wherein $R^1$ has 18 carbon atoms.

15. A composition as claimed in claim 14 wherein $R^1$ has 18 carbon atoms, $R^2$ is methyl and $R^3$ is methyl.

16. A composition as claimed in claim 13 wherein there is present an amount of the amine inhibitor such that there is 1–20 nitrogen atoms present for each Pt atom present.

17. A composition as claimed in claim 16 wherein the amine inhibitor is present in an amount such that there is 1 nitrogen atom present for each Pt atom present.

18. A composition of matter comprising
    (a) an organopolysiloxane containing from 67 to 85 mol percent $C_6H_5SiO_{3/2}$ units and 33 to 15 mol percent of $CH_2\!=\!CH(CH_3)_2SiO_{\frac{1}{2}}$ units, said organopolysiloxane having an average of at least 8 silicon atoms per molecule;
    (b) a silicon hydride containing polysiloxane crosslinker for (a), said (b) being present in an amount sufficient to provide about 0.9 to 1.1 mol of silicon hydride per mol of $CH_2\!=\!CHSi\!\equiv$ present in (a);
    (c) a platinum catalyst of the formula $[(C_4H_9)_3PPtCl_2]_2$; and
    (d) a catalyst inhibitor of the general formula $R^1R^2R^3N$ wherein $R^1$, $R^2$ and $R^3$ are each monovalent alkyl radicals containing from 1 to 28 carbon atoms, there is a total of from 12 to 30 carbon atoms in the molecule.

19. A composition as claimed in claim 18 wherein $R^1$ has 18 carbon atoms.

20. A composition as claimed in claim 19 wherein $R^1$ has 18 carbon atoms, $R^2$ is methyl and $R^3$ is methyl.

21. A composition of matter as claimed in claim 18 wherein there is present 80–90 parts of (a); 20–25 parts of (b); 5–15 ppm of Pt from (c) and (d) is present in an amount sufficient to inhibit the catalytic effect of (c).

22. A composition of matter as claimed in claim 21 wherein there is present 86 parts of (a); 21.5 parts of (b); 10 ppm of Pt from (c) and (d) is present in an amount sufficient to inhibit the catalytic effect of (c).

23. A composition as claimed in claim 22 wherein (d) is present in an amount such that there is 1–20 nitrogen atoms present for each Pt atom present.

24. A composition as claimed in claim 23 wherein (d) is present in an amount such that there is 1 nitrogen atom for each Pt atom present.

25. A composition of matter as claimed in claim 18 when cured.

26. An article comprising an electronic component encapsulated with the composition of claim 18 and cured.

27. An article in accordance with claim 26 which is a backpack transistor.

28. An article in accordance with claim 26 which is a transformer.

29. An article in accordance with claim 26 which is a gas sensor for electronic auto emission testing.

* * * * *